United States Patent [19]

Bunten, III et al.

[11] 4,381,543

[45] Apr. 26, 1983

[54] CONTROLLER PORT SWITCH ARRANGEMENT FOR SHARING STORED DATA AMONG DIFFERENT SYSTEMS

[75] Inventors: Roland J. Bunten, III; John E. Hickman, both of San Jose, Calif.

[73] Assignee: International Business Machines Corporation, Armonk, N.Y.

[21] Appl. No.: 230,937

[22] Filed: Feb. 2, 1981

[51] Int. Cl.³ .............................................. G06F 13/00
[52] U.S. Cl. .................................................. 364/200
[58] Field of Search ........................................ 364/200

[56] References Cited

U.S. PATENT DOCUMENTS

| | | | |
|---|---|---|---|
| 4,207,609 | 6/1980 | Luiz et al. | 364/200 |
| 4,253,144 | 2/1981 | Bellamy et al. | 364/200 |
| 4,253,146 | 2/1981 | Bellamy et al. | 364/200 |
| 4,276,609 | 6/1981 | Brereton et al. | 364/200 |

Primary Examiner—Harvey E. Springborn
Attorney, Agent, or Firm—Richard E. Cummins

[57] ABSTRACT

A switching arrangement is disclosed which permits storage devices to be shared by two separate controllers, each controller in turn receives commands and transfers the stored data to a different data processing system. The arrangement involves a plurality of subchannels, each of which comprises at least one addressable storage device and two addressable interlocked port switches, each of which functions to connect one side of the subchannel and the device to one of the controllers. The subchannel switching arrangement is characterized by each switch being addressable as if it were another device, which permits the port switches to be implemented with minimal changes to either the controller or the device.

10 Claims, 6 Drawing Figures

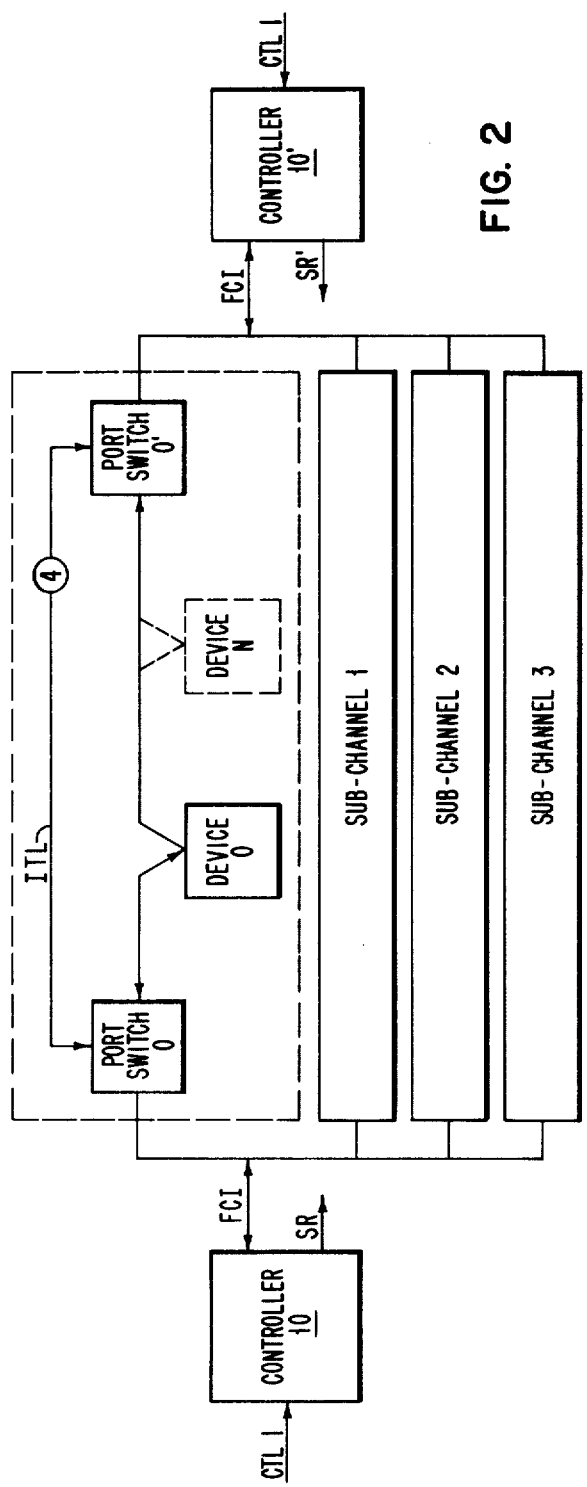
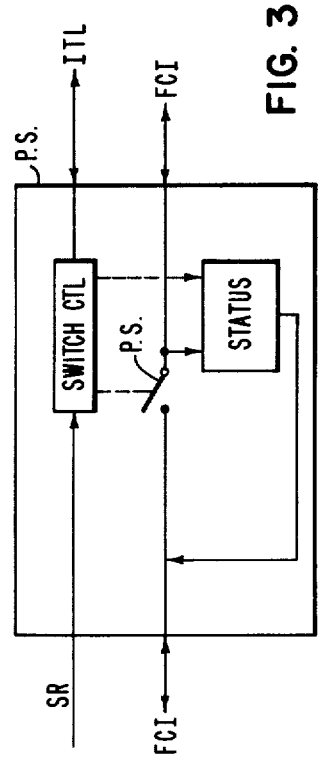
FIG. 2
FIG. 3

CONTROLLER PORT SWITCH ARRANGEMENT FOR SHARING STORED DATA AMONG DIFFERENT SYSTEMS

DESCRIPTION

1. Technical Field

This invention relates in general to data processing systems which are configured to share data stored in a device which is accessible through two separate paths. More specifically, the invention involves sharing data stored in a string of devices which are individually addressable from either one of a pair of controllers that are supplied with address selection signals from two separate control units associated with different data processing systems.

2. Background of the Invention

The prior art has disclosed various arrangements which permit a storage device such as a disk file to be shared by more than one data processing system. The reasons for electing to share data are generally well known and can be summarized as follows:

1. Storage space and costs may be saved as only one copy of the data is required.
2. In the event of hardware failure of one system, the data is accessible to the other system, which if necessary, could process it for the failed system.
3. It is much easier to update one copy than to update several copies.
4. The need to move data from one system to another is eliminated.

The sharing of a storage device or a string of storage devices among CPU's necessarily involves some type of switching arrangement. In IBM System 360 and 370 systems and protocols, a storage device or a string of storage devices is connected to the CPU through a control unit and a channel. If the switching arrangement which permits sharing involves switching the input of the control unit between a pair of channels, the arrangement is generally referred to as a "two channel switch." If the switching arrangement involves switching the string of storage devices between a pair of control units, the arrangement is generally referred to in the art as a "string switch." Reference may be had to the IBM publication entitled *Introduction to IBM Direct Access Storage Devices and Organization Methods*, Form GC20 1649-10, available from the International Business Machines Corporation, Data Processing Division, 1133 Winchester Avenue, White Plains, New York, for a more detailed explanation and description of two channel switches and string switches.

The prior art also discloses, in U.S. Pat. No. 4,207,609, a data processing system in which a plurality of disk files are shared by a plurality of central processing units. In the described implementation, a plurality of separate paths are possible between each addressable storage device and each CPU through the control unit and the channels. The switching arrangement disclosed therein is such that the states of the segments of each possible path is stored so that when an interconnection is desired between a CPU and a storage device, reference to the stored states of the various path segments permits a path to be established whenever there are free segments between existing switching nodes of the system. The disclosed switching arrangement has been referred to in the art as "dynamic pathing" in that the state of the various path segments are dynamically mapped.

The arrangement in most applications enhances the system performance and permits greater availability of the shared data relative to the string switch and two channel switch arrangements. This is because with the string switch arrangement, the entire string appears busy when one device in the string is selected. In the "dynamic pathing" arrangement, the non-selected devices in the string are addressable by the second controller even though one device has been selected by the first controller; hence, the resulting increase in the availability of stored data. However, it will be appreciated that the cost of dynamically mapping the state of the various path segments, in terms of actual hardware, programming cost, and system performance in continually updating the map, cannot be justified for all data processing applications.

A switching arrangement which is less costly but provides access to other devices on the string when one device is busy is, therefore, desirable.

SUMMARY OF THE INVENTION

In accordance with the present invention, a string of storage devices such as disk files are connected to separate control units through separate file controllers such that each file is addressable from either control unit through its associated controller. A switching arrangement is provided between each file of the string and the controllers which permits other files in the string to be accessed by the second controller when the first controller has accessed one file of the string. Overall availability of the shared data to the two control units and associated CPU is, therefore, increased. The novel switching arrangement requires substantially no change to the storage device or to the storage contollers since the switches are disposed between the normal output port of the controller and the input interface of the device.

The switching arrangement is characterized by a pair of addressable switches having the same address connecting one device to each controller with each pair of switches being interlocked to permit access by only one controller.

The simplicity of such an arrangement and the advantages thereof will become apparent from the following detailed description of the preferred embodiment when read in connection with the drawings.

BRIEF DESCRIPTION OF THE DRAWINGS

FIG. 2 is a block diagram of a storage subsystem involving a pair of device controllers and the novel switching arrangement for connecting each device of the string to the controllers;

FIG. 3 illustrates in block form one of the port switches shown in FIG. 2;

DESCRIPTION OF THE INVENTION

Figure 1:
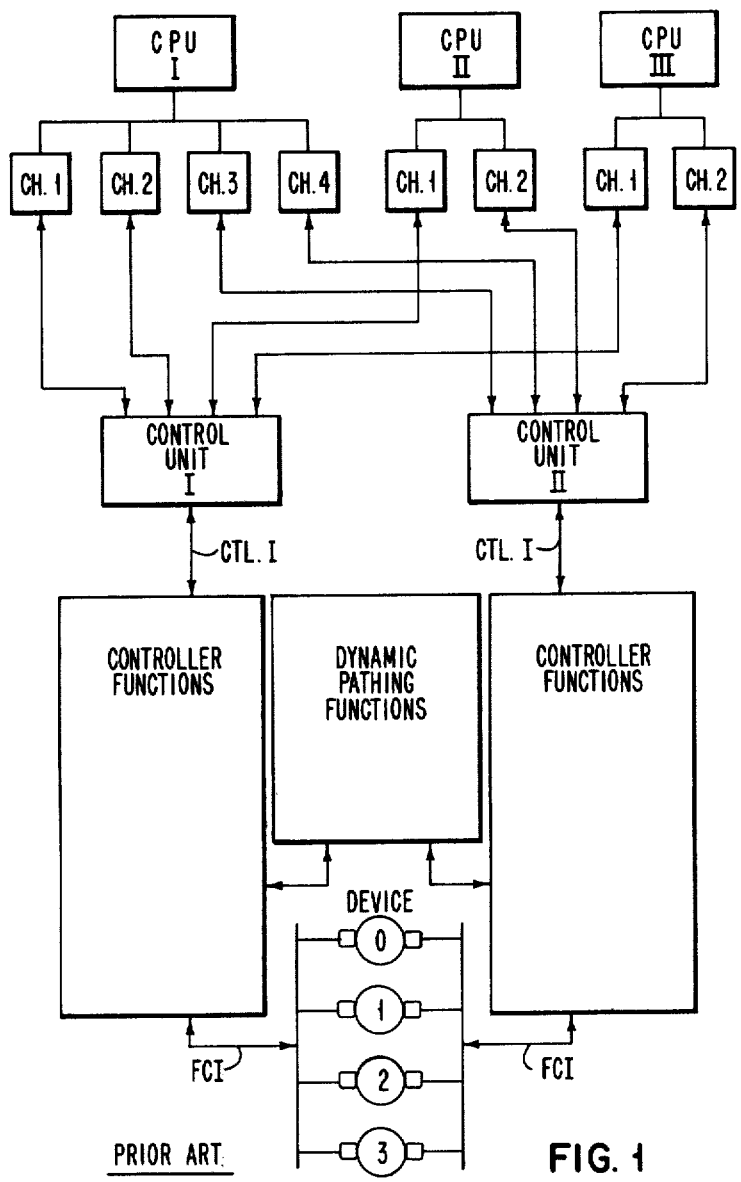
FIG. 1 is a block diagram of a multiprocessing system showing a string of disk files connected in a multiprocessing environment by means of the prior art "dynamic pathing" concept.

The system shown in FIG. 1 corresponds generally to the system disclosed in U.S. Pat. No. 4,207,609 which permits data stored on devices 0 through 3 to be shared by three separate CPU's. The illustrated configuration of CPU's, channels and control units is a typical IBM-type 360/370 system configuration. The connection of the string of storage devices 0 through 3 to each control unit represents the "dynamic pathing" approach to this shared storage arrangement referred to earlier in connection with prior art systems. The interface between control unit I and the controller is referred to in the art as the CTLI Interface, the details of which may be found in the IBM 3370 Product Attachment Information Manual. The interface between the controller and the devices is referred to in the art as the File Controller Interface or FCI.

As is well known, one of the devices 0 through 3 is selected when one of the CPU's issues a start I/O command to an associated channel which, in turn, issues a Channel Command Word or CCW to its associated control unit. The CCW contains the device address to be selected so that the control unit, in turn, issues a series of its commands which, when interpreted by the controller, selects the addressed device for connection to the control unit. The path established by a selection sequence involves the CTLI interface from the control unit to the controller and the FCI interface from the controller to the device. As shown in FIG. 1, the devices 0 through 3 are connected by a parallel set of FCI interfaces from each controller. In configurations not provided with "dynamic pathing", the devices may be "daisy-chained" to the controller. In either situation, the serial data channel for transferring the data between a device and the controller is separate from the FCI. The read data is decoded in the controller and converted into parallel form. Also in the controller, the write data is encoded and serialized for each device.

FIG. 2 illustrates in block diagram form a storage subsystem embodying the present invention. As shown in FIG. 2, the storage subsystem comprises a pair of controllers 10 and 10' which are connected, for example, to control unit I and control unit II of the system shown in FIG. 1 through respective CTLI interfaces. The system further includes four storage subchannels 0 through 3. Each subchannel includes a storage device and a pair of port switches PS and PS', each of which functions generally to connect the storage device of the subchannel to its associated controller 10 or 10'. As shown, an interlock line ITL extends between the port switches PS and PS'. The function of the interlock line is to prevent both switches from being closed at any one time.

The general function of the port switch is to connect the FCI interface cable from its associated controller to the device in response to a Select Request signal which is provided by the controller. The Select Request signal is provided by the controller along with the device address received from the control unit. Operation of the port switch in response to a Select Request signal connects the device to the controller and interlocks the other port switch of the channel so that it cannot respond to a Select Request signal for the device from the other controller.

FIG. 3 illustrates schematically one of the port switches PS shown in FIG. 2. As shown schematically, the switch comprises a switch control box SWC having an input to which the Select Request line is connected; two interlock output lines which are sent to the other switch PS' to prevent its operation when the Select Request line closes switch PS; and two other input lines from the port switch PS' corresponding to the interlock lines from the switch PS.

The switch control logic block functions to connect the FCI interface from the controller 10 to the device and to a status logic block STA. The status logic block provides status data to the FCI interface as to the status of certain aspects of the subchannel and/or the storage device, such as if the subchannel is busy or has been assigned or reserved to one of the controllers. The status of the switch PS may be set from either controller, as will be seen in FIG. 4 which is a detailed logic diagram of the various logical components associated with one of the subchannels.

Before proceeding to FIG. 4 and the detailed description of the embodiment of the present invention, the operation of the system shown in FIG. 2 during the selection sequence will be described and compared to the normal selection of a device in a string of devices.

As is well known in the art, the CTLI interface between the control unit and controller comprises a number of different buses and control lines. Similarly, the FCI interface between the controller and device comprises buses and control lines. Commands and control parameters are generally provided to the device on an 8-bit bus referred to as Device Bus Out. Status information is provided to the controller from the device on an 8-bit bus referred to as Device Bus In. A Tag Bus extends from the controller to the device which defines generally the type of data that exists on Bus Out. A number of other lines are used to deskew signals in each of the devices, to acknowledge and request service, and to maintain selection of the device once it has been obtained.

The concept of the present invention involves viewing each port switch as a device from the standpoint of addressing during a selection sequence, i.e., the port switch is addressed as if it were a storage device. If the addressed port switch is not busy, the associated device is automatically connected when the switch closes, and the other port switch is locked out. The port switch may include status registers or latches similar to those in the device, such as an Assignment Latch, a CE Mode Latch, and a Pack Change Latch, etc. The status latches in each switch are set and reset by tag commands from the controllers. The switch, if addressed by the controller, may therefore, appear busy if, for example, the device has been reserved or assigned to the other switch or the device has been placed in the CE Mode for servicing. Similarly, if the Pack Change Latches are set in each switch indicating that the device has been off-line, the Pack Change Latches in each switch will be serviced by the respective controllers and reset, thereby advising the respective CPU's that the device is back on-line.

The storage subsystem shown in FIG. 2, in addition to providing greater availability of the data stored on the shared device, also permits the logic of each port switch to be controlled by an alternate path through another subchannel. For example, if one of the switches associated with the device of subchannel 0 becomes inoperative in that commands to the device cannot be transmitted through the switch, then unique commands may be sent through a switch associated with another subchannel and then to the device of the channel having the defective switch. Such an arrangement improves the overall reliability of the storage system and the availability of data.

DETAILED DESCRIPTION OF THE PREFERRED EMBODIMENT

Figure 4:
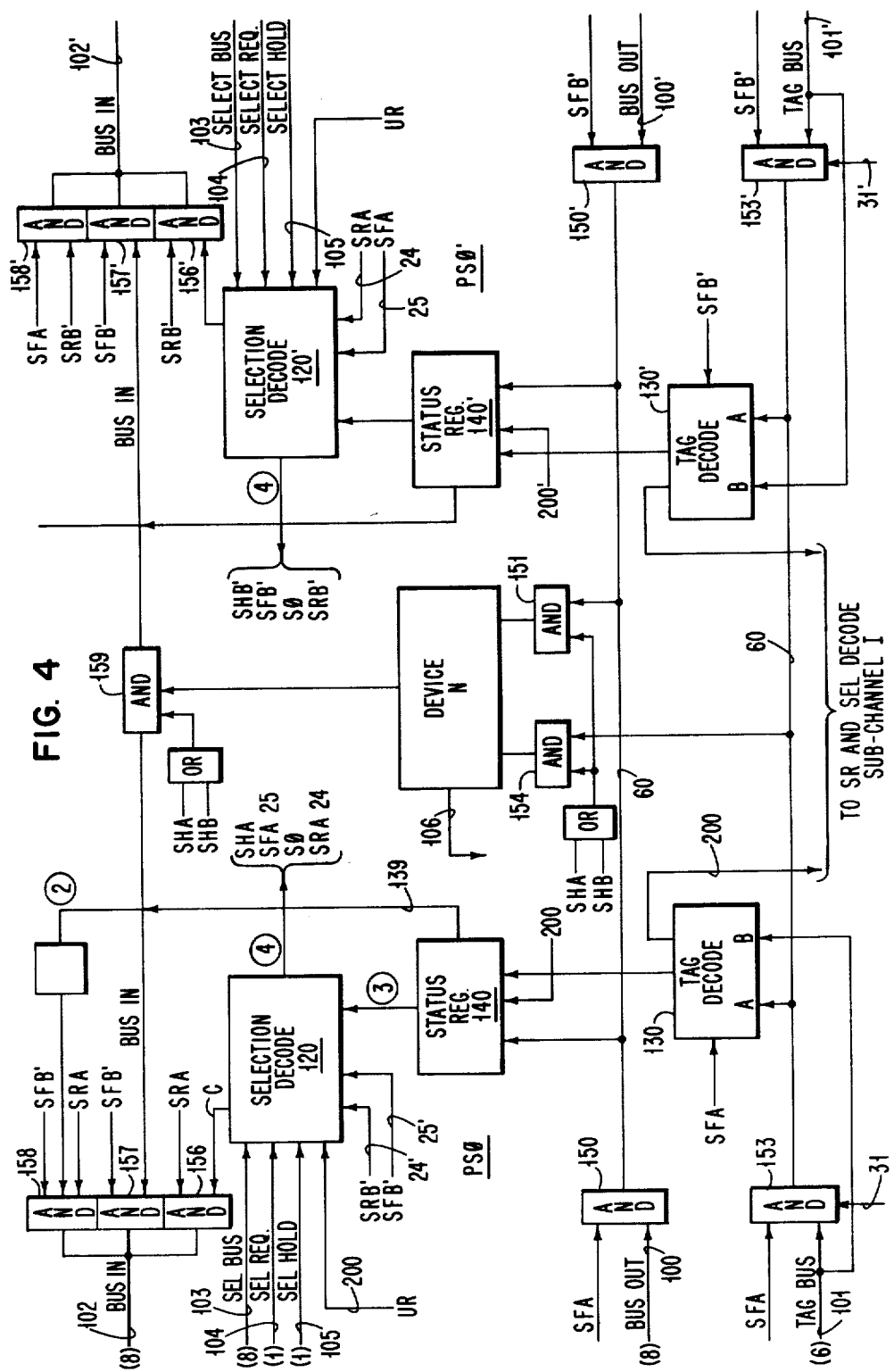
FIG. 4 illustrates in detail one of the subchannels shown in FIG. 2.

The preferred embodiment of the present invention is shown in detail in FIG. 4 in which device N is connectable to either controller through the port switches which are implemented, as shown, in digital logic.

The FCI interface from each controller, as shown, includes Bus Out 100, Tag Bus 101 which includes the tage gate line for deskewing signals on the Tag Bus, Bus In 102, and Select Bus 103. In addition, Select Request line 104, a Select Hold line 105 and an Attention/Response line 106 complete the interface lines from each of the controllers.

Each port switch, as shown in FIG. 4, comprises generally a Selection Decoder 120, a Tag Decoder 130, and a Status Register 140. In addition, the port switch includes a plurality of logical AND-gates for selectively connecting interface lines to the device N and to the components 120, 130 and 140 of the port switch.

As shown, Bus Out 100 from each controller is connected to its associated Status Register 140 and device N through AND-gates 150 and 151, respectively. Tag Bus 101 for each controller is connected to the Tag Decoder 130 through AND-gate 153 and to the device N through AND-gate 154. Bus In 102 is developed from one of three possible AND-gates 156 through 158. The output of device N is connected through AND-gate 159 and AND-gate 157. The output of Selection Decoder 120 is connected to AND-gate 156, while an output 139 of the Status Register 140 is connected to AND-gate 158. Selection Decoder 120, as shown in FIG. 4, has three inputs from the controller 10, namely one line 103 from Select Bus, the Select Request line 104 which is not part of the standard FCI interface, and the Select Hold line 105. The Selection Decoder 120 also receives two interlock output lines SRB' and SFB' from the Selection Decoder 120' associated with the other port switch PSO''. Selection Decoder 120, as shown in FIG. 4, also has three inputs from the Status Register 140, namely Device Assigned, CE Mode, and Pack Change status signal lines.

Selection Decoder 120 functions to logically combine in a straightforward, logical manner selected ones of the above described input signals to provide, first, a group of control signals for controlling the various gates and, secondly, a group of status signals which are supplied to Bus In 102 through AND-gate 156.

Figure 5:
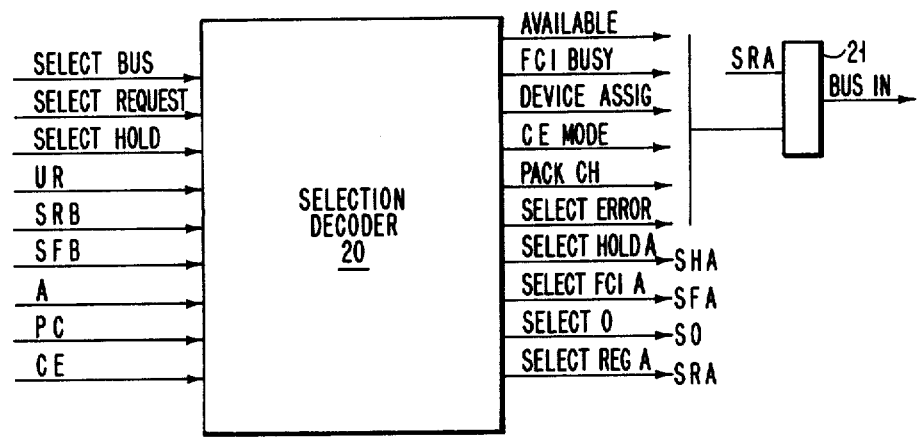
FIG. 5 illustrates in more detail the output lines of the Selection Decoder shown in FIG. 4.

FIG. 5 shows the various input and output lines of the Selection Decoder. The signals supplied to Bus In through AND-gate 156, as shown in FIG. 5, comprise the following signals:

1. Available, which indicates that device N and the port switch are available;
2. FCI Busy, which indicates that device N is not available;
3. Device Assigned, which indicates that the device has been assigned by the other controller 10' for exclusive use by controller 10';
4. CE Mode, which indicates the device is being serviced by the Customer Engineer;
5. Pack Change, which indicates that the device has been returned to an on-line condition and is available to the system.

The last three signals, Device Assigned, CE Mode, and Pack Change, originate from the Status Register 140. The FCI Busy signal results from operation of the other switch having control of the interface lines to the device N. A Select Error signal is provided merely to reflect an error condition in the switch and operates as an alert to the selecting controller.

The remaining output signals, SHA, SFA, SRA, and SO, are generated primarily in response to the three input signals from the controller, and are used primarily as enabling signals to the various logical AND-gates. The Select Request input signal will be decoded as the Select Request signal SRA, provided the Select Bus has the appropriate bit significant address matching the address of the port switch and the interlock from the other switch is not active. A Select Request Latch is set to provide the SRA signal. A similar Select SFA Latch is set, the output of which provides the SFA signal that is employed as the interlock signal for the other port switch PSO'. The Select Hold A signal SHA is developed by gating the Select Hold input signal with the output of the SFA latch. Select Hold A and Select Request A are used to control whether commands on Bus Out 100 and Tag Bus 101 are gated on the Tag Decoder 130 and Status Register 140, or to the corresponding registers in device N.

The port switch is selected first by raising Select Request 104 with the appropriate address on the Select Bus 103. If the switch is available, the available status is returned on Bus In 102 and the switch is captured. Select Hold 105 is then raised, in which case command and tag data from the controller will be sent directly to the device N rather than to the switch. Command and tag data from the controller is sent to the Status Register 140 and Tag Decoder 130 by dropping Select Hold 105 and maintaining Select Request 104 active. Deselection of device N occurs when Select Hold 105 is dropped.

Figure 6:
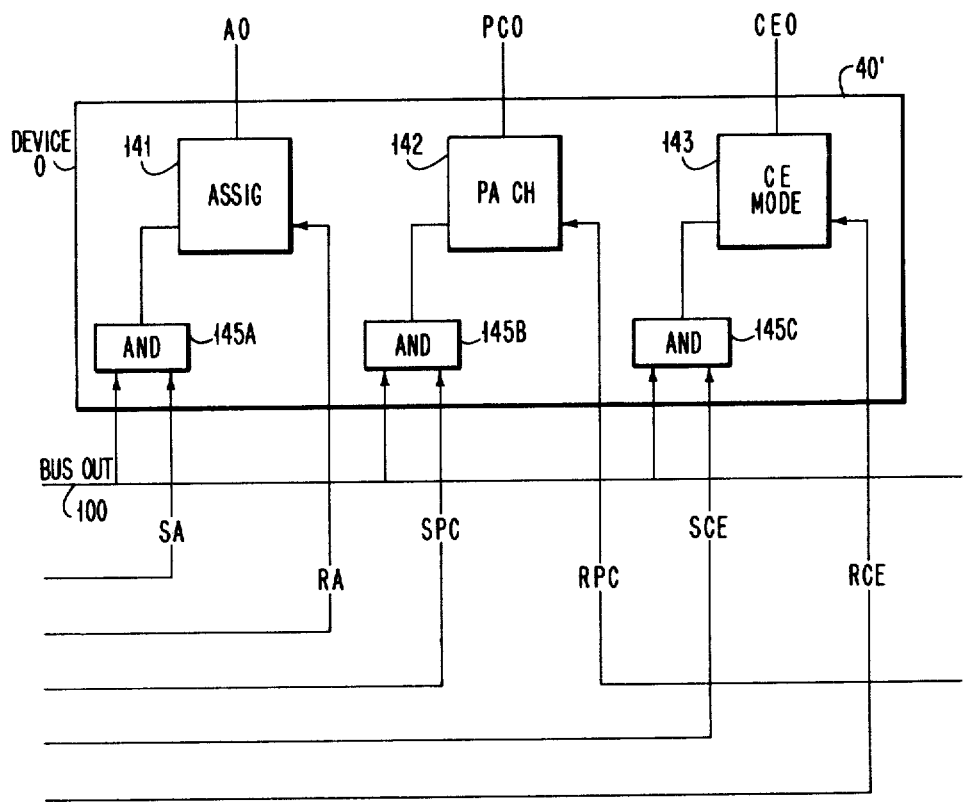
FIG. 6 illustrates the details of one of the Status Registers shown in FIG. 4.

FIG. 6 shows the details of the Status Register 140. As shown, the register comprises three separate latches 141, 142 and 143, designated respectively the Assignment Latch, the Pack Change Latch, and the CE Mode Latch. The latches are set through AND-gates 145A, B, and C, each of which is supplied with a different predetermined line of Bus Out and set signals SA, SPC and SCE from the Tag Decoders 130. The latches 141, 142 and 143 are reset from the output of the Tag Decoder 130.

The Assignment Latch 141, associated with the port switch PSO, is set by the command on Bus Out 100 from the controller 10' and a tag on Tag Bus 101, that also is sent from the controller 10' through PSO' to Tag Decoder 130. Stated differently, the state of the Assignment Latch 141 associated with port switch 0 indirectly reflects a Not Available status to its associated controller since the latch is really set and reset under the control of the other controller.

The CE Mode Latch is set from either controller and reflects a Busy or Not Available status of the device to both controllers 10 and 10'. It is also reset from either controller.

The Pack Change Latch, associated with controller 10, is set from commands and tags from controller 10'. However, the Pack Change Latch is reset by commands and tag decodes from controller 10.

The state of the Pack Change Latch indicates to the system that the device has recently been brought back on-line. The Pack Change Latch is set by the other controller 10' and reset by its associated controller 10.

The operation of the subsystems shown in FIG. 2 and 4 will now be described in relation to the operation of device selection under several different conditions. The description will focus primarily on the relationship of the controller 10 to the port switch PS and device N, since the conventional interaction of the controller to the CPU through the control units and channels are not changed by the present arrangement.

The FCI interface buses and lines to the switch originate from registers of the output port of the controller. The FCI interface lines from the switch terminate at funnels of the input port. Reference may be had to U.S. Ser. No. 921,147, filed June 30, 1978 now U.S. Pat. No. 4,276,595 and assigned to the assignee of the present invention, for a detailed description of the input and output ports and the interface funnels and registers.

In the present system, four such port arrangements are provided at the controller with only one port, naturally, being active at any given time.

Device selection normally involves the controller placing an 8-bit byte on the Select Bus 103 where each bit position is an address of one device to be selected, placing a Select Tag on the Tag Bus 101 and placing an all zero byte on Bus Out 100. The controller 10 then raises the Select Request line 104 to initiate the actual selection process. Assuming the port switch PSO is available, raising the Select Request line 104 causes the Select Decoder 120 to raise the output line SRA and the output control line SFA. This causes the interlocking of the port switch PSO' associated with the other controller 10' so that it cannot connect to the device N. The status of Bus in 102' to controller 10' indicates that the device is busy to controller 10' and inhibits the gating of Bus Out 101' and Tag Bus 101', to switch PSO'.

Since the device N is neither assigned, nor under CE control, nor off-line, controller 10, in response to sensing the switch on Bus In 102, activates Select Hold.

Select Hold enables the AND-gates 151 and 154 associated with the device N so that the device is now selected. Controller 10 then interacts with the device N as if the port switch PSO was not involved, i.e., communication between the controller and the device are independent of the switch which is also transparent to the rest of the system.

Once the Select Request line 104 has been raised, the Select Hold Line 105 is used to control the transfer of further commands from the controller 10 to the Status Registers 140 and 140' and to the Tag Decoders 130 and 130'. Commands such as Set Assignment, Set CE Mode, and Set Pack Change Latch are directed to the port switch whenever the Select Hold line 105 is dropped by controller 10 when these commands are issued. The set commands for Status Register 140 are sent by controller 10' through port switch PSO'. Reset commands to Status Register 140 are sent from controller 10 through port switch PSO.

The CE Mode latch for PSO is set from controller 10' and reset by controller 10'.

The Pack Change Latch for port switch PSO is set from controller 10' and reset from controller 10.

The Unconditional Release Tag is decoded by the Tag Decoder 103 of the port switch in one channel and supplied to the Status Register 140 of the port switch in an adjacent channel via line 200 to reset the Assignment Latch. This Unconditional Release command is a safeguard which permits access to a device in the event one port switch becomes inoperable after setting the Assignment Latch, preventing the other controller from accessing the device.

The controllers 10 and 10' are not shown in detail in that various controllers known in the art may be employed. For example, the microcontroller disclosed and claimed in U.S. Ser. No. 921,147, filed June 30, 1978 and assigned to the assignee of the present invention, may be advantageously employed to interconnect the devices 0 through 3 to an IBM-type 3880 control unit in the manner shown in the drawings.

As shown and described in the drawing, each controller is provided with four separate ports. Each of the four subchannels shown in FIG. 2, as shown, is provided with one addressable device. It will be obvious to those skilled in the art that, while only one device is shown associated with each channel, the device may, in practice, have two separate independently addressable file portions, such as exists in the IBM-type 3370 and 3375 disk files. In such an arrangement, each port switch will include the necessary status latches and controls to reflect the status of each addressable device.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. In a storage subsystem comprising a plurality of storage devices and first and second device controllers, each controller is connectable to at least one data processing system through a first interface and selectively to one of said plurality of devices through a second interface in response to a command which originates from said data processing system and identifies one of said devices, an improved arrangement for controlling the selective connection of each of said devices to either of said controllers in response to connection request commands from said controllers, said arrangement comprising in combination:

a plurality of subchannels, each of which includes:
  (a) a first port switch associated with said first controller and a second port switch associated with said second controller;
  (b) at least one of said devices;
  (c) interlocking means interconnecting said switches; and
  (d) bus means connecting said first and second device controllers to said at least one said device through said first and second port switches;

each said port switch including:
  (1) gating means for selectively connecting said bus means from said second interface of said associated controller to said device; and
  (2) control means, operable in response to a connection request command from its associated controller identifying one of said devices for:
    (a) controlling said gating means provided said switch is associated with said device identified in said command and provided said device is available; and
    (b) operating said interlocking means to prevent said port switch associated with said other controller from responding to a request connection command for said selected device.

2. The combination recited in claim 1 in which said bus means includes a first section extending between said first controller and said first port switch, a second section extending between said second controller and said second port switch, and a third section extending between said switches and said gating means includes a plurality of logical gates connected between said third section and said device.

3. The combination recited in claim 2 in which each said control means includes a selection decoder having an input connected to said second interface of said controller for receiving said connection request command; and said interlocking means for one switch comprising the output of said selection decoder of said control means of said other switch, whereby said selection decoders operate to interlock the other port switch in response to a connection request command.

4. The combination recited in claim 3 in which said second interface includes a select hold line connected to said selection decoder to develop a select hold signal and means connecting said select hold signal to said plurality of logical gates disposed between said device and said third section.

5. The combination recited in claim 4 in which each said port switch further includes a tag decoder and a status register, each of which is connected to said third section of said bus means, whereby command data from the controller that is selectively attached to said third section through one of said port switches may be entered into the tag decoder and status register associated with either said switch.

6. The combination recited in claim 5 in which said select hold line and said connect request line determine whether command data from said connected controller is sent to said device or selectively to said tag decoder and said status register.

7. The combination recited in claim 6 in which the output of said status register is connected to said selection decoder and the output of said tag decoder is connected to the input of said status register.

8. The combination recited in claim 7 in which said status register includes an assignment latch, a CE mode latch, and a pack change latch.

9. The combination recited in claim 8 in which said tag decoder has an output line connected to reset an assignment latch of the status register in an adjacent said channel.

10. The combination recited in claim 8 in which said assignment latch is resettable from a tag decoder in an adjacent said subchannel.

* * * * *